(12) United States Patent
Ozsoylu

(10) Patent No.: US 6,502,995 B1
(45) Date of Patent: Jan. 7, 2003

(54) VIRTUAL BALL JOINT

(75) Inventor: Suat Ali Ozsoylu, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 42 days.

(21) Appl. No.: 09/663,549

(22) Filed: Sep. 18, 2000

Related U.S. Application Data
(60) Provisional application No. 60/154,607, filed on Sep. 17, 1999, and provisional application No. 60/159,822, filed on Oct. 15, 1999.

(51) Int. Cl.⁷ ............................. F16C 23/08; F16C 33/58
(52) U.S. Cl. ................................... 384/496; 384/517
(58) Field of Search .......................... 384/496, 495, 384/497, 498, 504, 512, 513, 516, 517; 180/427, 428, 444, 445; 74/388 PS

(56) References Cited

U.S. PATENT DOCUMENTS

| | | | | |
|---|---|---|---|---|
| 637,204 | A | * 11/1899 | Heath | 384/497 |
| 1,234,779 | A | * 7/1917 | Ljungberg | 384/497 |
| 1,284,827 | A | * 11/1918 | Vorraber | 384/498 |
| 1,321,417 | A | * 11/1919 | Carlborg et al. | 384/497 |
| 4,766,970 | A | * 8/1988 | Shimizu | 180/444 |
| 4,825,972 | A | * 5/1989 | Shimizu | 180/444 |
| 5,083,626 | A | * 1/1992 | Abe et al. | 180/445 |
| 5,590,732 | A | * 1/1997 | Sugino et al. | 180/444 |
| 6,186,268 | B1 | * 2/2001 | Onodera et al. | 74/388 PS |

* cited by examiner

*Primary Examiner*—Thomas R. Hannon
(74) *Attorney, Agent, or Firm*—Edmund P. Anderson

(57) ABSTRACT

A virtual ball joint, comprising a pair of bearings disposed about a center of curvature; each of the bearing comprising an inner race and an outer race supporting a plurality of balls therebetween. The inner and outer races have angled surfaces in contact with the balls, such that the outer angled surfaces coincide with an imaginary sphere centered about the center of curvature. A shaft mounted in the bearings may thus be rotated about the center of curvature as if mounted with a ball joint.

12 Claims, 4 Drawing Sheets

VIRTUAL BALL JOINT

CROSS-REFERENCE TO RELATED APPLICATIONS

This application is based upon, and claims the benefit of, U.S. Provisional Application Nos. 60/154,607, filed on Sep. 17, 1999, and 60/159,822, filed on Oct. 15, 1999, the disclosures of both of which are incorporated by reference herein in their entirety.

FIELD OF THE INVENTION

This disclosure relates to mechanical joints, particularly those used with sleeve-and-rack assemblies.

BACKGROUND OF THE INVENTION

It is known to provide power assist to a steering assembly by providing a sleeve surrounding and threadingly engaged with the rack such that rotation of the sleeve by a motor imparts force to the rack, thereby assisting the driver in steering the vehicle. However, providing such a sleeve causes the steering system to be overconstrained, thereby resulting in high friction and excessive wear and tear. Such systems as have actually been put into production show high friction and wear at the sleeve, indicating that the rack is not moving linearly along the axis of the sleeve, thereby causing strain. This implies that prior art sleeve-and-rack systems are overconstrained. What is needed is a means to relieve the constraint.

BRIEF SUMMARY OF THE INVENTION

Disclosed is a "virtual ball joint" that comprises a pair of bearings, each having outer races with angled surfaces coinciding with a spherical surface, thereby allowing spherical motion of the inner and outer races relative to one another about a center of curvature. A shaft mounted in the bearings is thereby able to rotate about the center of curvature as though mounted with a ball joint. The device is particularly useful for mounting ball screw rack sleeves used in power assisted sleeve-and-rack steering assemblies. By so doing, two degrees of freedom are added to the power assist system, thereby transforming the sleeve-and-rack assembly from an overconstrained mechanical system to an underconstrained one. It is further disclosed that the load bearing capabilities of such a virtual ball joint are adequately preserved so long as the relative spherical motion of the bearing races is limited to no more than a fraction of a degree.

DETAILED DESCRIPTION OF THE INVENTION

Figure 1:
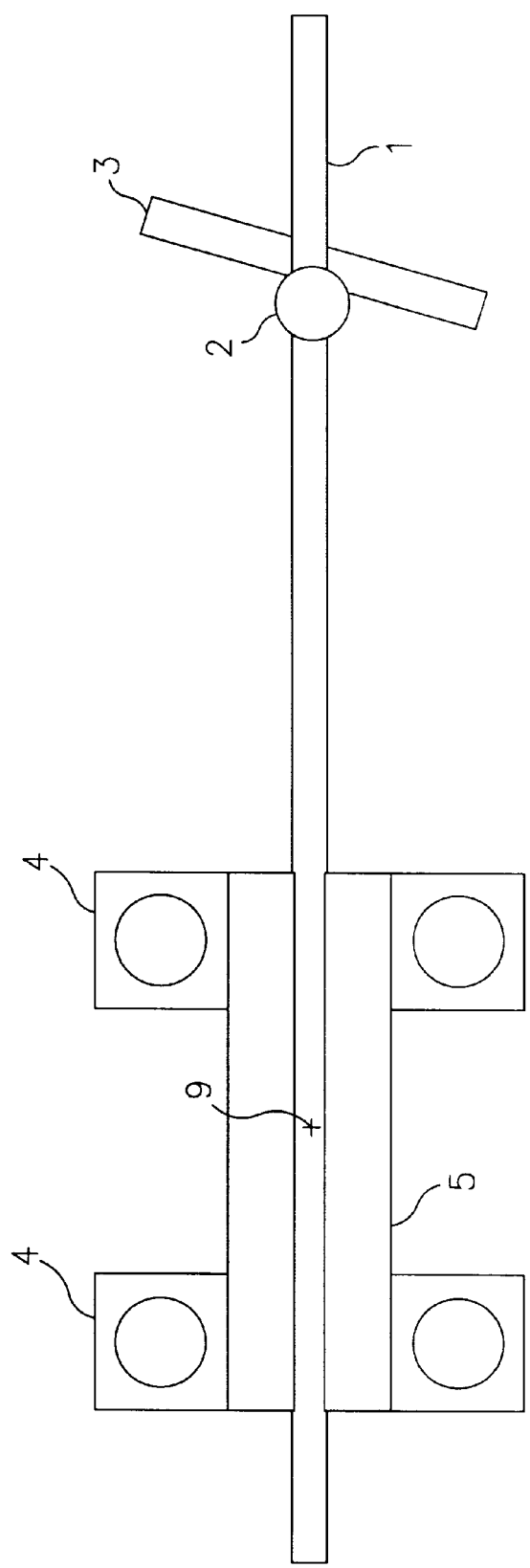
FIG. 1 shows a typical arrangement for assisted power steering.

Referring to FIG. 1, there is shown a power assisted rack 1 and pinion 3 mechanism having a rack bearing 2. The pinion 3 is connected to a steering wheel causes the rack 1 to move from side to side as the steering wheel is turned in one direction or the other. The movement of the rack 1 is assisted by a sleeve 5 which is threadingly engaged with the rack 1 such that the rotation of the sleeve in one direction or the other will cause the rack to move back and forth and thereby turn a plurality of roadwheels linked to the rack. The sleeve 5 is rotatalby mounted to the frame or chassis of the automobile by a pair of bearings 4. The sleeve 5 will typically be a ball screw 15 that is driven by an electric motor 16. The electric motor 16 responds to a power steering assist system 17 that will usually be responsive to torque sensors 19, mounted on the steering column or on the pinion 3, and thereby provide power assist to the driver of the vehicle. A preferred sleeve and power assist mechanism is a ball screw rack having a rolling key such as is described in U.S. patent application Ser. No. 09/662,931, entitled BALL SCREW RACK ASSEMBLY, filed Sep. 15, 2000, the disclosures of which are incorporated by reference herein in their entirety and which in turn is based upon U.S. provisional patent application No. 60/154,682, filed Sep. 17, 1999, the disclosures of which are also incorporated by reference herein their entirety.

However, these systems can provide significant wear and tear on the sleeve 5 as result of the rack 1 deviating from it's own assembly axis 14, due to bending and tolerances, when steering the vehicle. This places significant stress on the sleeve 5 and, hence, the bearings 4. It has been discovered that this stress is completely relieved by permitting rotational motion of the sleeve 5 about a center of curvature or point 9 located between the bearings 4.

Figure 2A:
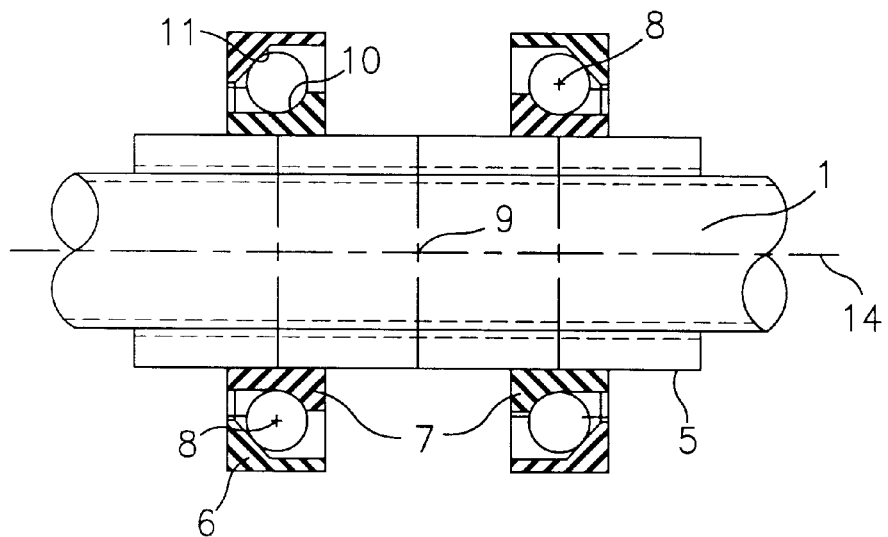
FIG. 2a shows a cross-sectional view of a virtual ball joint in a first position.
Figure 2B:
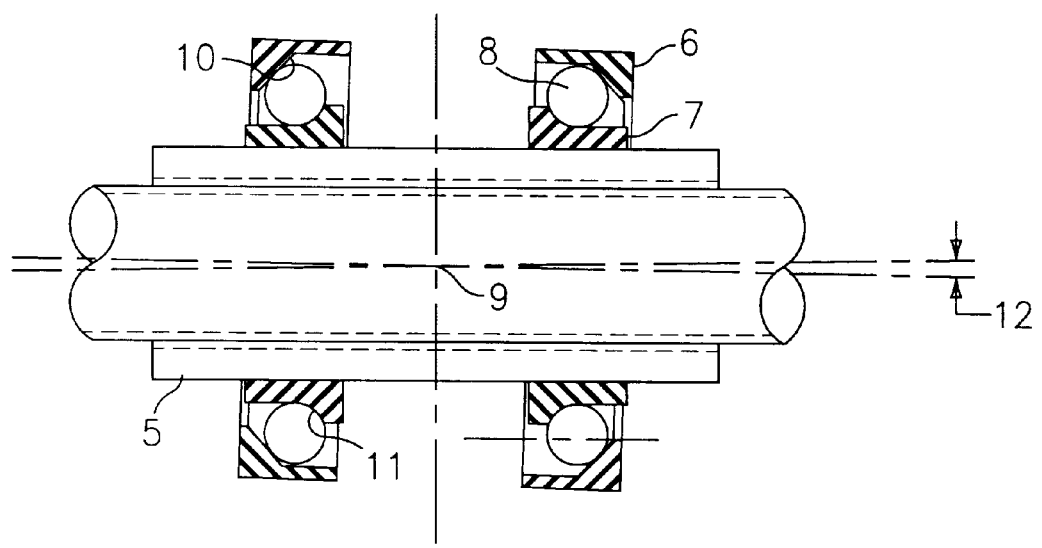
FIG. 2b shows a cross-sectional view of the virtual ball joint of FIG. 2a in a second, rotated position.

Referring to FIGS. 2a and 2b, each bearing 4 comprises an inner race 7 and an outer race 6, between which are supported a plurality of balls 8. The inner race is provided with an inner angled surface 10 that opposes an outer angled surface 11 on the outer race 6.

Figure 3:
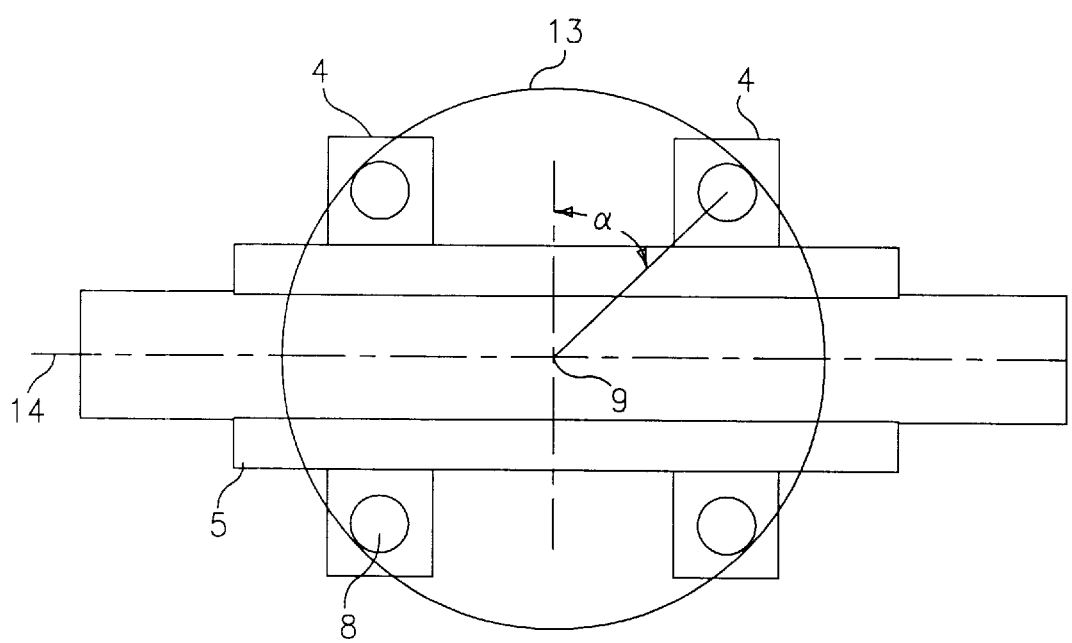
FIG. 3 schematically shows the sphere defined by the angled surfaces in the races.

Referring to FIGS. 2a, 2b, and 3, the outer angled surfaces 11 correspond to the surface of an imaginary outer sphere 13 that has a center at point 9. This is clearly seen in schematic form in FIG. 3. The radius of curvature of the outer sphere 13 is determined from the ball 8 circle diameter and the contact angle, $\alpha$, formed between the ball 8 and the inner surface 10, such that it is equal to the half ball circle diameter multiplied by the cosine of the contact angle, $\alpha$. This measurement also determines the distance between the bearings 4 and the center of curvature of the outer angled surface 11 to be exactly in the middle of the bearings 4 and on the axis of the rack 1, namely at point 9.

Referring back to FIGS. 2a and 2b, it can be seen that the sleeve 5 and rack 1 pivot about the center of curvature 9 in any direction, because the inner race 7 can spherically rotate relative to the outer race 6, albeit for relatively small movements, thus behaving like a virtual ball joint. Nevertheless, small freedom of movement is all that is needed to relieve the stresses on the rack 1 described above. However, it has also been found that allowing too much movement reduces the load-bearing capacity of the bearing 4. Generally, the range of spherical movement of the inner race 7 in relation to the outer race 6 will be from about 0.1 to about 1 degree, preferably less than a degree, more preferably about 0.25 degrees. This allows sufficient freedom of movement to solve the constraint problem with sleeve 5 and rack 1 while providing acceptable load carrying capability for bearing 4. Accordingly, FIG. 2b shows the same mechanism of FIG. 2a, but with the sleeve 5 rotated upward slightly about the center of curvature 9 by a rotation angle 12.

Mechanical kinematics requires that the degrees of freedom (d.o.f) of any mechanism must be equal to the number of inputs. In the instant situation, we have the following components:

| Link | Link | Joint Type | Constraint of d.o.f. |
|---|---|---|---|
| Pinion | Housing | Revolute | 5 |
| Rack Bearing | Housing | Cylinder | 4 |
| Ballscrew Nut | Housing | Revolute | 5 |
| Ballscrew Nut | Ballscrew Screw | Screw | 5 |
| Rack Bearing | Rack | Cam + 1 Axial | 2 + 1 |
| Pinion | Rack | Gear + 1 Axial | 2 + 1 |
| Housing | Ground | Fixed | 6 |
| TOTAL | | | 31 |

The degree of freedom of the entire mechanism may be calculated by:

$$\text{d.o.f.} = 6*(\text{No. of Links}) + \text{sum}(\text{Constraint of Joint}) = 6*5 - 31 = -1 \quad (1)$$

The mechanism has a negative d.o.f., indicating that the system is overconstrained. The overconstraint problem is solved by removing two constraints from the link between the ballscrew nut and the housing, thereby converting the revolute joint type into a ball joint type as follows:

| Link | Link | Joint Type | Constraint of d.o.f. |
|---|---|---|---|
| Pinion | Housing | Revolute | 5 |
| Rack Bearing | Housing | Cylinder | 4 |
| Ballscrew Nut | Housing | Ball | 3 |
| Ballscrew Nut | Ballscrew Screw | Screw | 5 |
| Rack Bearing | Rack | Cam + 1 Axial | 2 + 1 |
| Pinion | Rack | Gear + 1 Axial | 2 + 1 |
| Housing | Ground | Fixed | 6 |
| TOTAL | | | 29 |

Inserting into equation 1, above, results in a positive calculated d.o.f. of 1, thereby indicating that the system is now underconstrained.

In the past, the initial accurate positioning of the sleeve 5 over the rack 1 was necessary, but rather difficult to achieve with the bearings 4 placed in position. This adjustment was usually done by a threaded adjuster (not shown). Also, proper adjustment of the bearings 4 was frequently required to maintain the components in alignment and to reduce wear and tear. The excess wear and tear creates an audible noise when the load on the rack 1 increases, or the travel direction of the sleeve 5 is reversed. Moreover, if the sleeve housing 20 is constructed of material other than steel, then it will be subjected to thermal expansion and contraction affecting the alignment of the bearings 4 and the sleeve 5.

Figure 4:
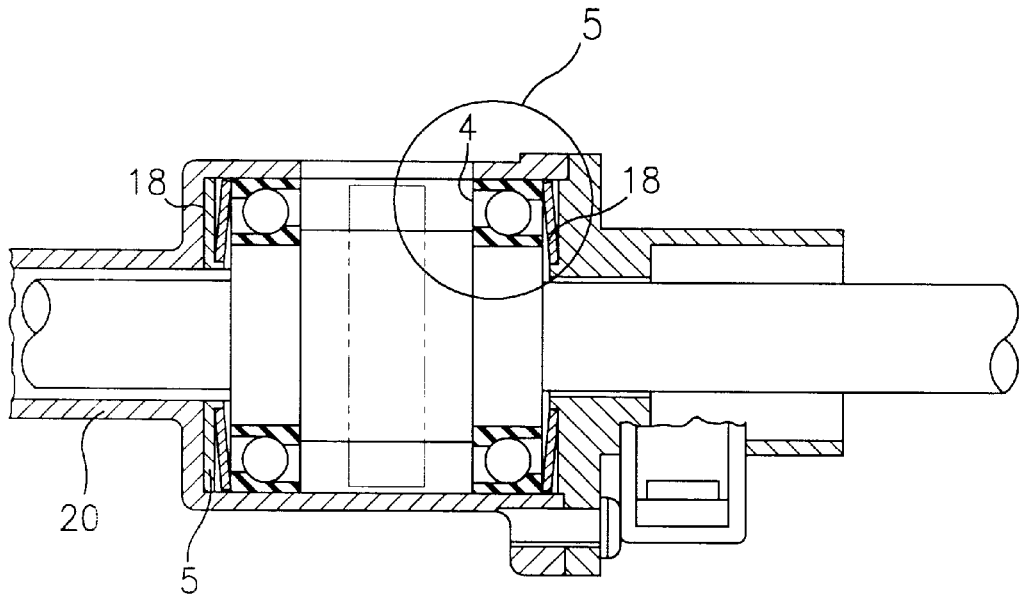
FIG. 4 is a cross-sectional view of a virtual ball joint with the belleville springs.
Figure 5:
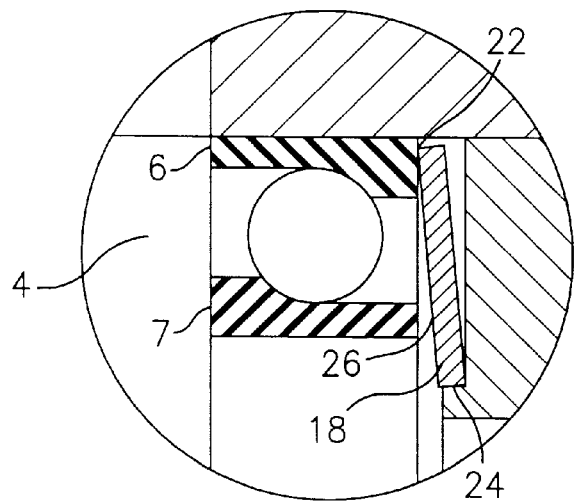
FIG. 5 is an enlarged view of the circumscribed section of FIG. 4.

Referring to FIGS. 4 and 5, an embodiment of the virtual ball joint that overcomes the above mentioned shortcomings of the prior art includes a plurality of belleville springs 18, preferably two, having a generally frustoconical shape with an inner periphery 22 that is spaced axially from the plane of the outer periphery 24 such that a force, applied axially against the belleville spring, causes the inner periphery to move toward the outer periphery and thereby place the belleville spring under compression. This compression in an axial direction causes the belleville spring 18 to generate a reactive force proportional to the applied load, which reactive force is not uniform over the relatively small movement of the belleville spring. Thus, the reactive force and high elasticity of belleville spring 18 compensate for the developed misalignment caused by surface deterioration of the threaded sleeve 5 over the rack 1, and eliminates the need for future component alignment. Each belleville spring 18 is preferably disposed within the sleeve housing 20 on opposite sides of the sleeve 5 with each belleville spring 18 having its concave surface 26 facing the bearings 4 and the edges of the inner periphery 22 are contacted with the outer races 6 of the bearing 4. The outer diameter of the outer periphery 24 is sized to house the rack 1 movably therethrough. Therefore, the bearings 4 and the sleeve 5 are continuously adjusted due to the reactive force from each belleville spring 18, and the increased load on the rack 1 is countered by the reactive force from the belleville springs 18 keeping the rack 1 in an aligned engagement with the sleeve 5.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A virtual ball joint, comprising:
   a plurality of bearings;
   each of said bearings comprising an inner race and an outer race supporting a plurality of balls therebetween;
   said inner race comprising inner angled surfaces and said outer race comprising outer angled surfaces in contact with said balls, said angled outer surfaces coinciding with an imaginary sphere centered about a center of curvature such that said inner race is free to spherically rotate relative to said outer race; and
   a plurality of belleville springs disposed within a sleeve housing and secured against said outer race of each of said bearings wherein a rack shaft is slideably disposed within an outer diameter of an outer periphery of said belleville spring.

2. The virtual ball joint of claim 1 wherein said inner race is free to spherically rotate no more than from about 0.1 degrees to about 1 degree relative to said outer race.

3. The virtual ball joint of claim 2 wherein said inner race is free to spherically rotate no more than about 0.25 degrees relative to said outer race.

4. A rack assembly, comprising:
   a rack adapted to turn a plurality of roadwheels;
   a sleeve, threadingly and rotationally engaged with said rack so as to move said rack in a manner effective in tuning said roadwheels when rotated; and
   said sleeve mounted by a virtual ball joint, comprising:
   a plurality of bearings;
   each of said bearings comprising an inner race and an outer race supporting a plurality of balls therebetween;
   said inner race comprising inner angled surfaces and said outer race comprising outer angled surfaces in contact with said balls, said angled outer surfaces coinciding with an imaginary sphere centered about a center of curvature such that said inner race is free to spherically rotate relative to said outer race; and
   a plurality of belleville springs disposed within a sleeve housing and secured against said outer race of each of said bearing wherein a rack shaft is slideably disposed within an outer diameter of an outer periphery of said belleville spring.

5. The rack assembly of claim 4 wherein said sleeve comprises a ball screw.

6. The rack assembly of claim 4 wherein said sleeve is rotated by an electric motor that responds to a power steering assist system.

7. The virtual ball joint of claim 4 wherein said inner race is free to spherically rotate no more than from about 0.1 degrees to about 1 degree relative to said outer race.

8. The virtual ball joint of claim 7 wherein said inner race is free to spherically rotate no more than about 0.25 degrees relative to said outer race.

9. A steering mechanism for a vehicles comprising:
- a pinion being connected to a steering wheel of the vehicle;
- a rack shaft being movable by said pinion such that turning said steering wheel causes said rack shaft to move along a lateral axis, said rack shaft being connectable to roadwheels of said vehicle such that lateral movement of said rack shaft causes said roadwheels to steer said vehicle;
- a sleeve threadingly engaged with said rack shaft such that rotation of said sleeve also causes said rack shaft to move along said lateral axis;
- a pair of bearings being configured to rotatably mount said sleeve to said vehicle, wherein each bearing of said pair of bearings comprises:
  - an inner race having an inner angled surface;
  - an outer race having an outer angled surface; and
  - a plurality of balls being supported by said inner and outer angled surfaces, said inner and outer angled surfaces being configured to allow said inner and outer races to move relative to one another; and
- a biasing member in contact with said outer race so as to provide a reactive force on said outer race of each of said bearings, said reactive force being sufficient to cause said inner and outer races to move relative to one another such that surface deterioration of threads of said sleeve and said rack shaft is compensated for and said rack shaft is maintained in an aligned engagement with said sleeve, wherein said inner and outer angled surfaces are configured to allow said inner and outer races to spherically rotate relative to one another.

10. The steering mechanism as in claim 9, wherein said outer angled surface has a curvature that coincides with an imaginary sphere centered about a center of curvature, wherein a radius of said imaginary sphere is determined from a diameter measured from said center of curvature to a ball circle diameter and a contact angle formed between said plurality of balls and said inner surface.

11. The steering mechanism as in claim 10, wherein aid inner race is free to spherically rotate no more than from about 0.1 degrees to about 1 degree relative to said outer race.

12. The steering mechanism as in claim 10, wherein said inner race is free to spherically rotate no more than about 0.25 degrees relative to said outer race.

* * * * *